United States Patent Office 3,345,182
Patented Oct. 3, 1967

3,345,182
PREPARING AROMATIC SPRAY DRIED COFFEE
Arno Huste, Forest Hills, Robert J. Breza, New City, and Richard B. Kohler, Yorktown Heights, N.Y., assignors to General Foods Corporation, White Plains, N.Y., a corporation of Delaware
No Drawing. Filed Oct. 5, 1965, Ser. No. 493,265
3 Claims. (Cl. 99—71)

This application is a continuation-in-part of Ser. No. 260,082 filed Feb. 20, 1963 now abandoned.

This invention relates to a method for producing soluble coffee of improved flavor and taste and more particularly relates to an improved process for aromatizing spray-dried coffee.

Present soluble coffee is produced by spray-drying coffee extract at high temperatures (500° F. or above) which cause rapid or flash evaporation of moisture from the extract. This form of spray-drying has the advantage of being relatively economical due to the rapid drying rates possible. However, the high air temperatures used to accomplish flash evaporation of moisture in the coffee causes a substantial loss of many of the volatile aromatic compounds, particularly those aromatics with a boiling point below that of water. It is for this reason that present instant coffee can be characterized as being substantially devoid of volatile aromatics. Any aroma impact achieved in these "instants" is usually imparted to the coffee after spray-drying by plating coffee oil with or without volatile aromatics onto the coffee powder. While this gives an improvement in aroma on opening a container of instant coffee, it has not significantly improved the taste or flavor of the reconstituted coffee in the cup.

In an effort to retain more volatiles, spray-drying at ambient temperatures of below 150° F., say 32° to 140° F., has been attempted. However, this type of spray-drying has not proven practical since it necessitates the use of pre-dried air and huge towers which allow sufficient time for the atomized particles to be dried while falling through such air.

It is an object of this invention to improve the flavor and taste of soluble coffee by modifying conventional spray-drying equipment.

Another object of this invention is to produce a spray-dried coffee containing a high percentage of the volatile aromatics which are usually lost during conventional spray-drying.

This invention is founded on the discovery that a soluble coffee of improved aroma and taste may be produced by a process which comprises forming an aqueous extract of roasted coffee solids, said extract having a soluble solids concentration of between 35 to 55%, and then spray-drying said extract at an inlet temperature of between 150° to 300° F. and an outlet temperature of between 130° to 260° F.

While this invention may be practiced by using conventional co-current and counter-current techniques of spray-drying, it is preferred that the spray-drying procedure be conducted in a manner known as "reverse-flow spray-drying." This latter drying technique is shown in French Patent 1,006,474 issued Apr. 23, 1952 to Pierre Robert Laguiharre. In this process, liquid is atomized from a nozzle at the bottom of the spray-drying chamber and projected upwardly in a vertical manner. The droplets follow a trajectory up the drying zone until a velocity of zero is reached and then begin to fall freely downward under the influence of gravity and the circulating drying air. This type of drying method allows each droplet of coffee to be dried in a manner which enhances retention of aromatic volatiles for each particular droplet size since each atomized droplet is kept within the drying zone for the minimum drying time required for that droplet, the drying time being proportional to the particle size.

This procedure of spray-drying under the conditions of this invention will retain between 80 to 95% of the aromatic volatiles present in the extract prior to drying. Predominant among the volatiles retained will be that class of volatiles which have a boiling point of below 212° F. When other forms of spray-drying are used, such as co-current and counter-current, retention of volatile aromatics will be less, somewhere in the nature of 60 to 85% retention.

Prior to spray-drying the extract, the extract must have a concentration of between 35 to 55% soluble solids. Extract of this concentration may be achieved by known techniques. In the case where a liquid extract of lower concentration contains desirable aromatic compounds and must be concentrated to above 35% solids, it is essential that this extract be concentrated in a manner which avoids degradation or loss of these aromatic compounds. Thus, high temperatures above 300° F. must be avoided. Freeze-concentration or other low-temperature concentration methods should be employed. In the case where the coffee extract is a dearomatized extract (the volatile aromatics being removed by a prior step), it is not essential that high temperature concentration methods be avoided completely. However, care should still be taken not to degrade the liquid extract itself even though aromatic material may have been previously removed from the coffee solids.

Typically, the aromatic material removed will be coffee oil in the form of expressed coffee oil and volatile aromatics in the form of steam-distilled volatile aromas defined by the patents to Nutting 2,562,206 and Mahlmann 3,132,947. It is the volatile aromatics which are degraded by the use of high temperatures during drying. Of course, other volatile aromas, such as vacuum distilled aromas, while not preferred can still be used. These aromatic fractions are shown by Lemonnier 2,680,786 and Mook et al. 3,035,922. The volatile aromatics are added to the coffee extract after the concentration step. The aromatized extract is then spray-dried at the critical temperature and concentration limits disclosed.

While the temperature and concentration limits will vary somewhat within the broad limits outlined, depending on the particular volatiles employed, it has been found that 40 to 46% soluble solids concentration and an inlet temperature of between 220° and 250° F. is preferred. This range of temperature and concentration will allow a volatile aroma retention of between 90 to 95% in the case where the volatile steam aroma fraction is of the type shown in the Mahlmann patent and reverse flow spray-drying is used.

Particle size of the atomized coffee will usually be in the range of 100 to 250 microns and residence time of these particles inside the drying chamber will range between 10 to 30 seconds. However, larger particles of 500 microns or more can be dried if the spray-drying equipment is modified accordingly.

It is theorized that the improved results obtained by the process of this invention are due to the formation of a protective surface film of dry coffee solids which forms on each particle as it is dried. This film serves to encase or trap the volatile aromatics present inside each particle of coffee as the coffee is dried. At very low temperatures (below 150° F.) it is believed that this film forms too slowly to act as an effective means for retaining the volatiles within the coffee particles whereas at the high inlet spray-dried temperatures conventionally employed to film formation is rapid enough but is not effective in retaining the volatiles due to the high driving force employed to "flash" evaporate the moisture from the particles.

The specific particle size of the atomized coffee is not important, as long as the initial contact with the drying air be moderate enough to form the aroma-retentive drying film on the wet particles and the driving force for the remainder of the drying cycle be such that the volatiles are not vaporized along with the moisture which is being removed. However, as the particles become larger in size more residence time is necessary in the drying zone to allow drying of the particles.

If it is necesary to preheat the concentrated extract prior to spray-drying in order to avoid atomization problems, this should be done under pressure to avoid volatiles lost. Generally, preheating is not required at the above conditions.

Due to the necessary concentration step prior to spray-drying the dried coffee product may have a higher density than conventional soluble coffee. This density may be lowered by using known agglomeration techniques.

This invention will now be described more fully by reference to the following examples:

*Example 1*

Two hundred pounds of whole roasted coffee was introduced into a commercial oil expeller and expressed at 10,000 p.s.i.g. in a screw press wherein the screw had flights traveling within a complementary performated cage or screen concurrent to the feed of coffee. Sixteen pounds of oil was obtained, which was then clarified by passing it through a commercial pressure filter. Twelve pounds of clarified oil and 4 pounds of fines was obtained. The oil expression and clarification was carried out in a carbon dioxide atmosphere to prevent oil degradation. The clarified oil was then stored at 50° F. under carbon dioxide until ready for use.

The expeller cake resulting from the expression of the coffee was then pelletized by extruding it through ⅜ inch die holes and cutting it into pellet lengths in the order of ⅜ inch to ½ inch. The pellets were added to 800 lbs. of roasted and ground coffee. The mixture was introduced into a conventional commercial coffee extractor approximately 20 inches in diameter and 20 feet high. Steam at a pressure of 2–3 p.s.i.g. was introduced into the bottom of the percolator and permitted to pass through the column of coffee to wet the coffee and distill volatile aromatics. The steam was allowed to pass through the column for a period of 25 minutes. The vapors from the top of the column were collected during the last 10 minutes of steaming and condensed in a brine condenser at 35° F. under a carbon dioxide atmosphere. Five thousand cc. of the steam distillate was collected. The steam distillate collected in this manner was then held at 35° F. until it was used.

The steam coffee was extracted with 3000 lbs. of water under conventional coffee percolation techniques used in soluble coffee production. Three hundred pounds of soluble solids was extracted and collected as a liquid extract which weighed 900 lbs. The dearomatized extract having a solids concentration of 26% was freeze-concentrated to 45% solids by cooling the extract to 22° F. and removing water from the extract as ice crystals. The extract was then warmed to 60° F., about 90 lbs. of the concentrated extract was then removed. Six pounds of expressed oil was warmed to 65° F. and dispersed in the 90 lbs. of extract by homogenization at 2,000 p.s.i.g. The steam distillate was added to the remaining extract and mixed. The two coffee batches were then combined and fed to a co-current spray-drying tower having a 12 foot diameter and a drying zone of about 18 feet in height. The over-all tower height was 45 feet. The coffee was atomized under suitable pressure conditions to a maximum particle size of 250 to 300 microns. Inlet temperature was about 220° to 225° F. the particles had a residence time of between 10 and 30 seconds before the heated air exited from the dryer at about 200° F.

The dried coffee had a moisture content of 3%, a density of 0.35 g./cc., and reconstituted to give a soluble coffee of improved aroma and taste over conventional instant coffee.

Aroma retention when measured by gas chormatography was about 85% as compared to a 70% retention at 150° F. inlet and 130° F. outlet and a 65% retention at 300° F. inlet and 260° F. outlet. At inlet temperatures of below 150° F. and above 30° F. aroma retention values fell off rapidly to under 50% retention. At 90° inlet and at 500° F. inlet, aroma retention was less than 30%.

*Example 2*

The procedure of Example 1 was followed with the exception that the concentrated aromatized extract was spray-dried by the following procedure.

An external mixing 2-fluid-type spray nozzle was mounted approximately 6 feet above the bottom of the dryer chamber pointed vertically upward. Spray-drying was accomplished in a vertical dryer of the double cone-type 12 feet in diameter and 45 feet high. Suitable atomization conditions were selected to provide a maximum droplet size of about 250 microns, said conditions projecting the droplets into a trajectory which would carry them upward to near the top of the drying chamber. The concentrated extract, at a rate of 115 lbs. per hour, was pumped to the nozzle at a pressure about 5 p.s.i.g., and atomized to a maximum particle size of 250 microns. Drying air heated to a temperature of 250° F. was passed through a distributor at the top of the drying chamber at 5,000 cubic feet per minute and directed downwardly. The air left the dryer through a duct between the double cones at a temperature of 215° F. The final product had a moisture content of 3% and a density of 0.4 g./cc.

Aroma retention when measured by gas chromatography of this sample showed a 95% retention as compared to an 80% retention at 150° F. inlet and 70% retention at 300° F. inlet. Again, as inlet temperatures of below 150° F. and above 300° F. were used the aromatic retention values on the chromatograph fall off to below 50%.

*Example 3*

The procedure of Example 1 was followed with the exception that a counter-current drying operation was conducted having an inlet air temperature of 200° F. and an outlet air temperature of 160° F.

At 90° F. inlet and 75° F. outlet, the aromatic retention fell off to under 30%. At 500° F. inlet and 445° F. outlet, retention was found to be less than 20%.

While this invention has been described by reference to specific examples, it is understood to be limited only by the scope of the appended claims.

What is claimed is:

1. A process for producing soluble coffee of improved flavor and taste which comprises forming an aqueous extract of roasted coffee solids, said extract having a concentration of between 40 to 46% solids, and spray-drying said extract at a droplet size of between 100 and 250 micons, an inlet temperature of between 220° and 250° F. and an outlet temperature of between 200° and 220° F.

2. A process for producing soluble coffee of improved flavor and taste which comprises removing aromatic material from freshly roasted coffee, forming an aqueous extract of roasted coffee solids, said extract having a concentration of between 40 to 46% solids, adding said aromatic material to said extract, and spray-drying said extract at a droplet size of between 100 and 250 microns, an inlet temperature of between 220° and 250° F. and an outlet temperature of between 200° and 220° F.

3. A process of spray-drying an aromatic extract of coffee to obtain a product having a stable moisture content and a high level of aromatic volatiles which comprises removing coffee oil and volatile steam distilled aromas from said coffee, forming an aqueous extract of dearomatized coffee solids, concentrating said extract to a soluble solids level of 40 to 46% dispersing the coffee oil and the volatile aromas in said concentrated extract, atomizing said extract so that discrete particles having a size of between 100 and 250 microns are projected upwardly in a confined drying zone before falling freely downward in said zone, said discrete droplets being of different sizes, with the larger sized droplets having a longer trajectory than the smaller sized droplets; and drying said extract by contact with inlet air having a temperature of between 220° and 250° F. and an outlet temperature of between 200° and 220° F.

References Cited

UNITED STATES PATENTS

| | | | |
|---|---|---|---|
| 827,153 | 7/1906 | Jaques | 159—4 |
| 1,568,309 | 11/1925 | Dickerson | 99—206 |
| 2,562,206 | 7/1951 | Nutting | 99—71 |
| 3,035,922 | 5/1962 | Mook et al. | 99—71 |

FOREIGN PATENTS

| | | |
|---|---|---|
| 29,367 | 11/1905 | Great Britain. |
| 394,912 | 7/1933 | Great Britain. |
| 425,729 | 3/1935 | Great Britain. |

OTHER REFERENCES

Perry, J. H.: "Chemical Engineers' Handbook," 3rd ed., 150, McGraw-Hill Book Co., N.Y., p. 841.

A. LOUIS MONACELL, *Primary Examiner.*

RAYMOND N. JONES, *Examiner.*

M. W. GREENSTEIN, *Assistant Examiner.*